(12) United States Patent
Takasu et al.

(10) Patent No.: US 7,224,350 B2
(45) Date of Patent: May 29, 2007

(54) VIDEO DISPLAY APPARATUS AND VIDEO DISPLAY METHOD

(75) Inventors: Shigeru Takasu, Tokyo (JP); Motosuke Irie, Saitama (JP)

(73) Assignee: Sony Corporation (JP)

( * ) Notice: Subject to any disclaimer, the term of this patent is extended or adjusted under 35 U.S.C. 154(b) by 463 days.

(21) Appl. No.: 10/479,333

(22) PCT Filed: Jun. 27, 2002

(86) PCT No.: PCT/JP02/06499

§ 371 (c)(1),
(2), (4) Date: Dec. 1, 2003

(87) PCT Pub. No.: WO03/003341

PCT Pub. Date: Jan. 9, 2003

(65) Prior Publication Data

US 2005/0140701 A1    Jun. 30, 2005

(30) Foreign Application Priority Data

Jun. 27, 2001    (JP) ............................. 2001-195465

(51) Int. Cl.
*G09G 5/00*    (2006.01)
(52) U.S. Cl. ...................... 345/204; 345/691; 345/698
(58) Field of Classification Search .......... 345/3.1–3.2, 345/87–88, 94, 98, 204, 208, 213–214, 553–555, 345/691, 698, 699; 348/521, 554, 558; 715/716
See application file for complete search history.

(56) References Cited

U.S. PATENT DOCUMENTS 5,021,719 A * 6/1991 Arai et al. .................. 315/364
5,579,029 A * 11/1996 Arai et al. .................. 345/698
5,652,845 A * 7/1997 Arai et al. .................. 710/106
5,986,636 A * 11/1999 Wu ............................. 345/691

(Continued)

FOREIGN PATENT DOCUMENTS

JP    63-97994    4/1988

(Continued)

OTHER PUBLICATIONS

International Search Report (PCT/JP02/06499).

*Primary Examiner*—Richard Hjerpe
*Assistant Examiner*—Mansour M. Said
(74) *Attorney, Agent, or Firm*—Lerner, David, Littenberg, Krumholz & Mentlik, LLP

(57) ABSTRACT

An image display device well suited for a multi-scanning type monitor includes a video signal measurement circuit that detects a horizontal synchronization frequency fH and a vertical synchronization frequency fV from an input image signal that conforms to the GTF Standard. A main control portion calculates timing data relative to a waveform of the signal (21) using the frequencies fH and fV, calculates adjustment parameters for adjusting a size and a position using this timing data, and sets the adjustment parameters to deflection control circuits, so that an image of the image signal may be displayed well on a CRT. Since the timing data is calculated using the synchronization frequencies fH and fV of the input image signal, it is possible to save on a memory capacity without storing timing data that corresponds to a plurality of different kinds of image signals.

2 Claims, 11 Drawing Sheets

U.S. PATENT DOCUMENTS 6,333,751 B1 * 12/2001 Torii et al. .................. 345/698
6,449,517 B1 * 9/2002 Lee ............................ 700/83

FOREIGN PATENT DOCUMENTS

| JP | 03-038166 | 2/1991 |
| JP | 11-052934 | 2/1999 |
| JP | 2001-042809 | 2/2001 |

* cited by examiner

12b

12c

| PHYSICAL SIZES OF IMAGE REGION WIDTH ON SCREEN | D1 | | D2 | |
|---|---|---|---|---|
| HORIZONTAL SIZE ADJUSTMENT PARAMETERS | SH1 | | SH2 | |
| ACTIVE RATIO | r0 | | | |
| HORIZONTAL SYNCHRONIZATION FREQUENCIES | fH1 | fH2 | fH3 | fH4 |
| HORIZONTAL OFFSET RATIOS | $\delta rH1$ | $\delta rH2$ | $\delta rH3$ | $\delta rH4$ |
| DELAYS | $\Delta H1$ | | $\Delta H2$ | |
| HORIZONTAL POSITION PARAMETERS | PH1 | | PH2 | |

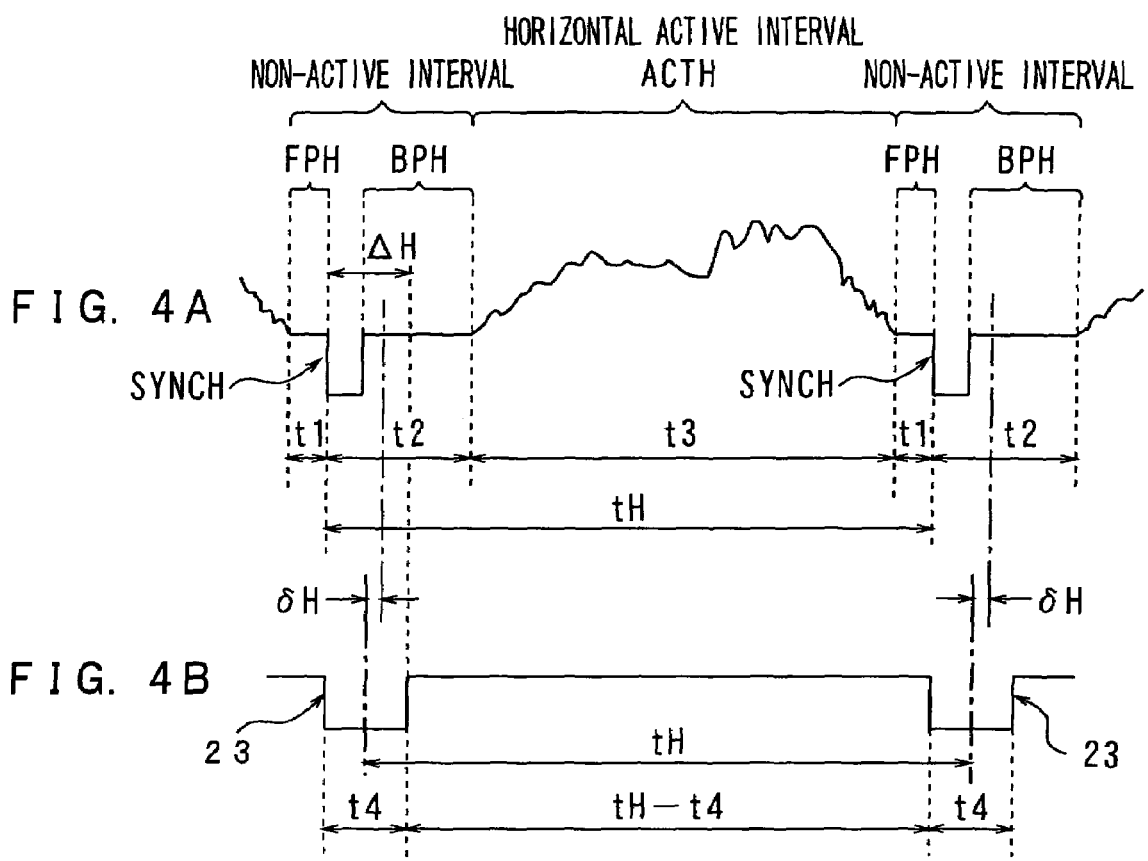
FIG. 4A
FIG. 4B
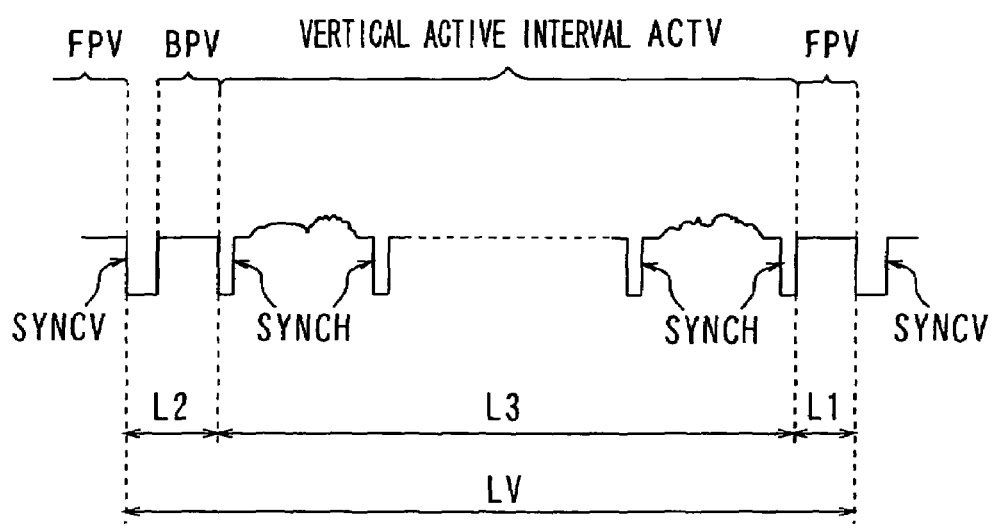
FIG. 5

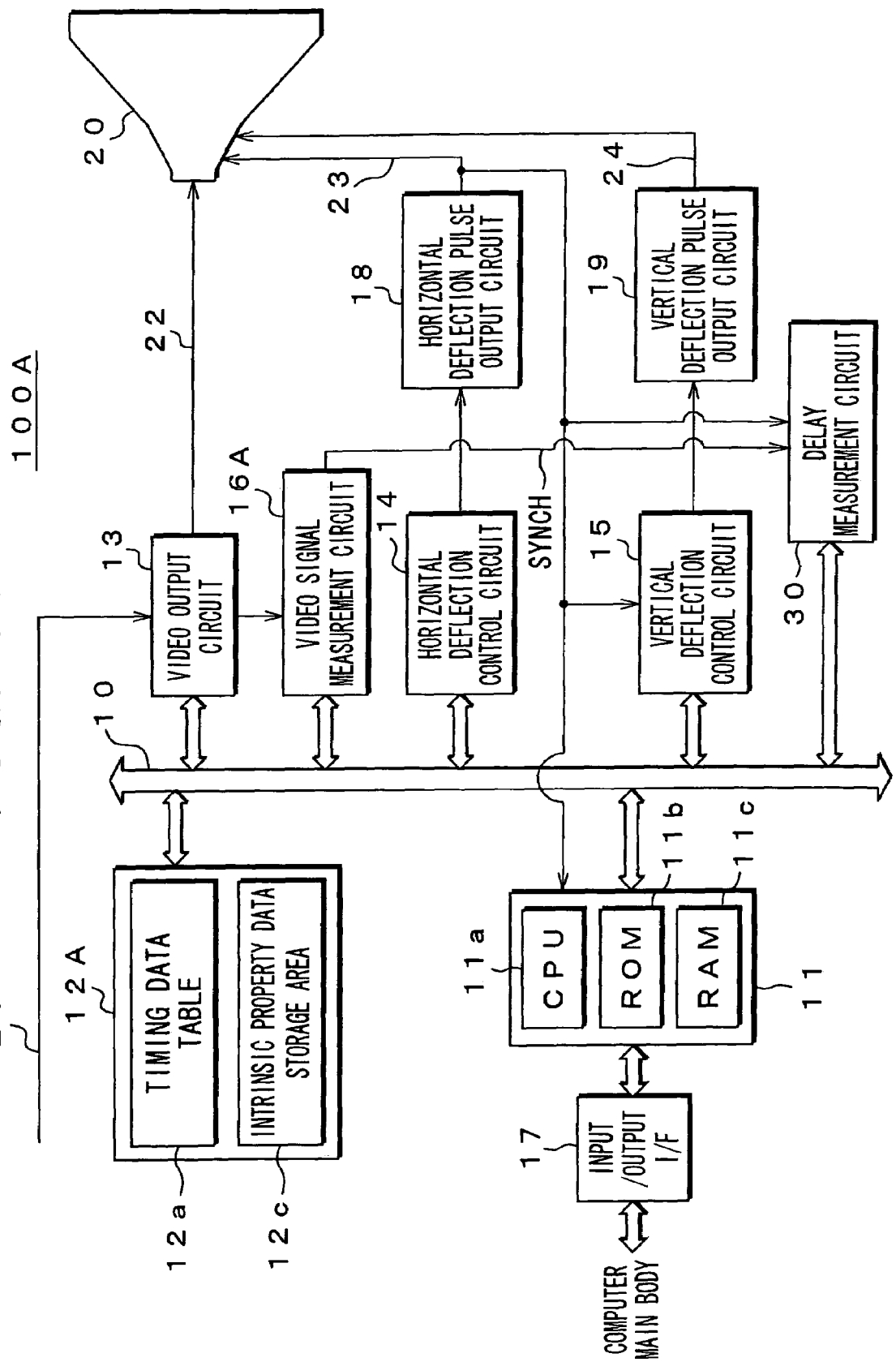

F I G. 1 1

| FREQUENCIES | | POLARITY | | TYPE | HORIZONTAL TIMING DATA | | | VERTICAL TIMING DATA | | |
|---|---|---|---|---|---|---|---|---|---|---|
| HORIZONTAL | VERTICAL | HORIZONTAL | VERTICAL | | t1 | t2 | t3 | L1 | L2 | L3 |
| 81.9K | 75 | N | N | SEP | ×××  | ××× | ××× | ××× | ××× | ××× |
| 63.5K | 70 | N | N | COM | ××× | ××× | ××× | ××× | ××× | ××× |

121 spans FREQUENCIES and POLARITY; 122 spans HORIZONTAL TIMING DATA and VERTICAL TIMING DATA; 12a refers to the table body.

VIDEO DISPLAY APPARATUS AND VIDEO DISPLAY METHOD

TECHNICAL FIELD

The present invention relates to image display device and method that can display an image in accordance with a plurality of kinds of input image signals.

More specifically, the present invention relates to image display device and method that, using a horizontal synchronization frequency and a vertical synchronization frequency detected from an input image signal, calculate timing data relative to a waveform of the input image signal and, using the timing data, calculate an adjustment parameter for adjusting an image display state and, based on the adjustment parameter, display an image relative to the input image signal, thereby eliminating a necessity of storing the timing data corresponding to the plurality of kinds of image signals for the purpose of obtaining the adjustment parameter corresponding to the plurality of kinds of image signals, thus enabling saving on a memory capacity.

Further, the present invention relates to image display device and method that, using timing data relative to a waveform of an input image signal, calculate an adjustment parameter for adjusting an image display state, set the adjustment parameter to a deflection control circuit, then measure a delay of a deflection pulse with respect to a horizontal synchronization signal of the input image signal, and alter a value of a horizontal position parameter to re-set it to the deflection control circuit so that the delay may be equal to a target value, thereby enabling setting a horizontal display position at a right position even if a deflection system is deteriorated over time.

BACKGROUND ART

Information processing apparatus including a personal computer, which uses a variety of image display devices such as a Cathode Ray Tube (CRT) or an Liquid Crystal Display (LCD), have been adapted to output various kinds of image signals according to different manufacturers, types, etc. Therefore, as an image display device having a function that can accommodate these various kinds of image signals, a device so-called a multi-scanning type monitor has been developed recently.

The following will describe an image signal (video signal) input from a typical information processing apparatus to an image display device, with reference to FIGS. 14 and 15. FIG. 14 shows a waveform of the video signal in its one horizontal scanning period and FIG. 15, a signal waveform of the video signal in its one vertical scanning period.

As shown in FIG. 14, each of the horizontal scanning periods is defined by a horizontal synchronization signal SYNCH having a constant cycle. Each of the horizontal scanning periods is comprised of a pulse width interval of the horizontal synchronization signal SYNCH, a back porch interval BPH, a horizontal active interval ACTH, and a front porch interval FPH. In the horizontal active interval ACTH of these, an image is actually displayed horizontally on a screen, while the back porch interval BPH and the front porch interval FPH are displayed as black borders at right and left ends respectively on the screen.

Further, as shown in FIG. 15, each of the vertical scanning periods is defined by a vertical synchronization signal SYNCV having a constant cycle. Each of the vertical scanning periods is comprised of a pulse width interval of the vertical synchronization signal SYNCV, a back porch interval BPV, a vertical active interval ACTV, and a front porch interval FPV. In the vertical active interval ACTV of these, an image is actually displayed vertically on the screen, while the back porch interval BPV and the front porch interval FPV are displayed as black borders at top and bottom ends respectively on the screen.

As shown in FIGS. 14 and 15, an image signal has a few timing factors (hereinafter referred to as "timing data"), so that if even only one of them is different, the image signal is different in kind. For example, typically, image signals having different frequencies (horizontal synchronization frequencies) of the horizontal synchronization signals SYNCH generally have the different back porch intervals BPH, horizontal active intervals ACTH, or even front porch intervals FPH. This holds true also in the vertical direction.

Kinds of such image signals are different with the corresponding devices such as a computer or a video card from which the image signal is outputted, thus numbering a few hundreds of kinds conceivably. The multi-scanning type monitor described above is required to be capable of displaying any kind of an image signal input thereto on its screen with a right size at a right position. Therefore, to accommodate such a requirement, the following methods have been employed conventionally.

A first method is as follows. That is, beforehand, at a factory, an image signal having known timing data is actually input to an image display device and make an adjustment so that an image may be displayed with a predetermined size at a predetermined position on a screen of the device, and the adjustment value (adjustment parameter) of this condition is written into a nonvolatile memory etc. corresponding to a kind of the image signal. Such the processes for adjustment and adjustment-value write-in are performed for all known image signals that are expected to be used. In actual use, on the other hand, the kind of an image signal input from a computer of a user is checked, so that an adjustment parameter corresponding to the kind is read out of the nonvolatile memory and used for the display.

A second method is as follows. That is, in actual use, all items of timing data relative to an input image signal are measured, so that based on the timing data, predetermined arithmetic operations are performed to obtain an adjustment parameter, which is in turn used for the display. In this case, in contrast to the first method, it is not necessary to perform adjustment at the factory beforehand.

However, for the first method, at the factory, it is necessary to adjust a few adjustment parameters for each kind of image signal, so that if a few hundreds of kinds of image signals are to be accommodated, adjustment is necessary each time the image signal to be input is switched, thus consuming much time and labor, which is a problem. To solve this problem, such a method may also be thought of that, for example, a size and a position of a display region on a screen are detected by sensors and then subject to automatic adjustment so that they may be optimized. However, this method needs to provide an automatic adjusting machine, thus contributing to an increase in manufacturing cost.

Further, for the second method, all items of the timing data relative to an input image signal are measured, so that based on the measured value, an adjustment parameter is calculated, thus deteriorating an adjustment accuracy if an error occurs in measurement, which is a problem. In particular, if the image signal has a high frequency or a small active interval (e.g., in a case where the signal represents a dot or a line), a large error may possibly occur in measurement to deteriorate the adjustment accuracy significantly.

Furthermore, it takes rather long time to measure the timing data relative to the image signal, thus prolonging a lapse of time from a moment when the image signal is input to a moment when a proper image appears on the screen, which is a problem.

To solve these problems, the present applicant has earlier proposed a method for first storing in storage means timing data relative to signal waveforms for each kind of an image signal, and, in actual use, detecting the kind of the input image signal to calculate an adjustment parameter using the timing data that corresponds to the kind of the image signal which has been stored in the storage means, thus displaying an image based on the adjustment parameter (see Japanese Patent Publication No. H11-52934). This method eliminates the problems of the first and second methods described above.

However, this method is adapted to store timing data that corresponds to a plurality of kinds of image signals and so requires a mass capacity memory, thus increasing costs of the device as a whole, which is a problem.

Further, this method of calculating an adjustment parameter using timing data that corresponds to a kind of an image signal in order to display an image based on the adjustment parameter has another problem that the image cannot be displayed at a right horizontal position if a deflection system is deteriorated over time.

DISCLOSURE OF THE INVENTION

It is an object of the present invention to eliminate a necessity of storing timing data that corresponds to a plurality of kinds of image signals in order to obtain adjustment parameters corresponding to the plurality of kinds of image signals, thus saving on a memory capacity.

It is another object of the present invention to enable setting a horizontal display position at a right position even if a deflection system is deteriorated over time, when displaying an image based on a calculated adjustment parameter.

An image display device related to the present invention comprises detection means for detecting a horizontal synchronization frequency and a vertical synchronization frequency of an input image signal, first arithmetic operation means for calculating timing data relative to a waveform of the input image signal using the horizontal synchronization frequency and the vertical synchronization frequency that are detected by the detection means, second arithmetic operation means for calculating an adjustment parameter for adjusting an image display state using the timing data calculated by the first arithmetic operation means, and image display means for displaying an image relative to the input image signal based on an adjustment parameter calculated by the second arithmetic operation means.

An image display method related to the present invention comprises the steps of detecting a horizontal synchronization frequency and a vertical synchronization frequency of an input image signal, calculating timing data relative to a waveform of the input image signal using the horizontal synchronization frequency and the vertical synchronization frequency thus detected, calculating an adjustment parameter for adjusting an image display state using the timing data thus calculated, and displaying an image relative to the input image signal, based on the adjustment parameter thus calculated.

By the present invention, a horizontal synchronization frequency and a vertical synchronization frequency are detected from an input image signal. The input image signal is such that timing factors of the image signal can be obtained by arithmetic operations as far as a horizontal synchronization frequency and a vertical synchronization frequency are known. For example, the image signal conforms to the Generalized Timing Formula (GTF) Standard of the Video Electronics Standards Association (VESA).

The timing data relative to a waveform of the input image signal is calculated using the horizontal synchronization frequency and the vertical synchronization frequency that are detected from the input image signal. Then, using the timing data is calculated an adjustment parameter for adjusting an image display state such as a size or a position, and then based on this adjustment parameter is displayed an image relative to the input image signal.

In such a manner, the horizontal synchronization frequency and the vertical synchronization frequency that are detected from the input image signal are used to calculate timing data relative to a waveform of the input image signal, and this timing data is in turn used to calculate the adjustment parameter for adjusting the image display state, so that a necessity of storing timing data corresponding to a plurality of kinds of image signals is eliminated, thus enabling saving on a memory capacity.

It is to be noted that by storing calculated adjustment parameters in storage means with them associated with the horizontal synchronization frequency and the vertical synchronization frequency, and when a predetermined one of the adjustment parameters that corresponds to the horizontal synchronization frequency and the vertical synchronization frequency that are detected from the input image signal is present in the storage means, an image relative to the input image signal can be displayed on the basis of the predetermined adjustment parameter to thereby immediately acquire the same kind of image signal from the storage means, if the same kind of image signal is input, without calculating timing data or adjustment parameters, in order to reduce a lapse of time from a moment when the image signal is input to a moment when the image is displayed, thus improving a response.

Another image display device related to the present invention comprises timing data acquisition means for acquiring timing data relative to a waveform of an input image signal, first calculation means for calculating adjustment parameters each for adjusting an image display state using the timing data acquired by the timing data acquisition means, setting means for setting the adjustment parameters calculated by the first calculation means to a deflection control circuit, delay measurement means for measuring a delay of a deflection pulse with respect to a horizontal synchronization signal of the input image signal, and re-setting means for altering a value of a horizontal position adjustment parameter of the adjusting parameters, the horizontal position adjustment parameter adjusting image region position in a horizontal direction, so that a delay measured by the delay measurement means may be equal to a target delay and for re-setting it to the deflection control circuit.

Another image display method related to the present invention comprises the steps of acquiring timing data relative to a waveform of an input image signal, calculating adjustment parameters each for adjusting an image display state using the acquired timing data, setting the calculated adjustment parameters to a deflection control circuit, measuring a delay of a deflection pulse with respect to a horizontal synchronization signal of the input image signal, and altering a value of a horizontal position adjustment parameter of the adjusting parameters, the horizontal position adjustment parameter adjusting image region position in a horizontal direction, so that the measured delay may be equal to a target delay and for re-setting it to the deflection control circuit.

In the present invention, timing data relative to a waveform of an input image signal is acquired. For example, a kind of the input image signal is detected, so that timing data corresponding to the detected kind of the input image signal is read out of data storage means in which the timing data relative to respective signal waveforms for each of the image signal kinds is stored.

It is to be noted that when there is no timing data in the data storage means that corresponds to a kind of an input image signal, timing data relative to the waveform of the input image signal is calculated using, for example, the horizontal synchronization frequency and the vertical synchronization frequency that are detected from the input image signal.

Further, for example, without utilizing the data storage means in which timing data is stored, the horizontal synchronization frequency and the vertical synchronization frequency of the input image signal are detected, and timing data relative to the waveform of the input image signal is calculated using the detected horizontal and vertical synchronization frequencies.

Then, using this timing data is calculated the adjustment parameters each for adjusting an image display state such as a size and a position, and these adjustment parameters are set to a deflection control circuit so that based on the adjustment parameters, an image relative to the input image signal may be displayed.

Then, a delay of a deflection pulse with respect to the input image signal is measured. In this case, if a deflection system is not deteriorated over time, by setting the calculated horizontal position adjustment parameter to the deflection control circuit, the delay becomes equal to a target delay value, so that a horizontal display position is set to a right position. If the deflection is deteriorated over time, on the other hand, this delay becomes different from the target delay value.

Therefore, a value of the horizontal position adjustment parameter is altered and re-set to the deflection control circuit so that this measured delay may be equal to the target delay value. With this, the horizontal display position is set to a right position even if the deflection system is deteriorated over time.

BRIEF DESCRIPTION OF THE DRAWINGS

FIGS. 4A and 4B are diagrams each for showing the respective waveform and horizontally deflection pulse of an input video signal in one horizontal scanning period;

FIG. 5 is a diagram for showing a waveform of the input video signal in one vertical scanning period;

FIG. 10 is a block diagram for showing a configuration of an image display device according to a second embodiment;

FIG. 11 is an explanatory diagram showing contents of a timing data table in a nonvolatile memory;

BEST MODE FOR CARRYING OUT THE INVENTION

Figure 1:
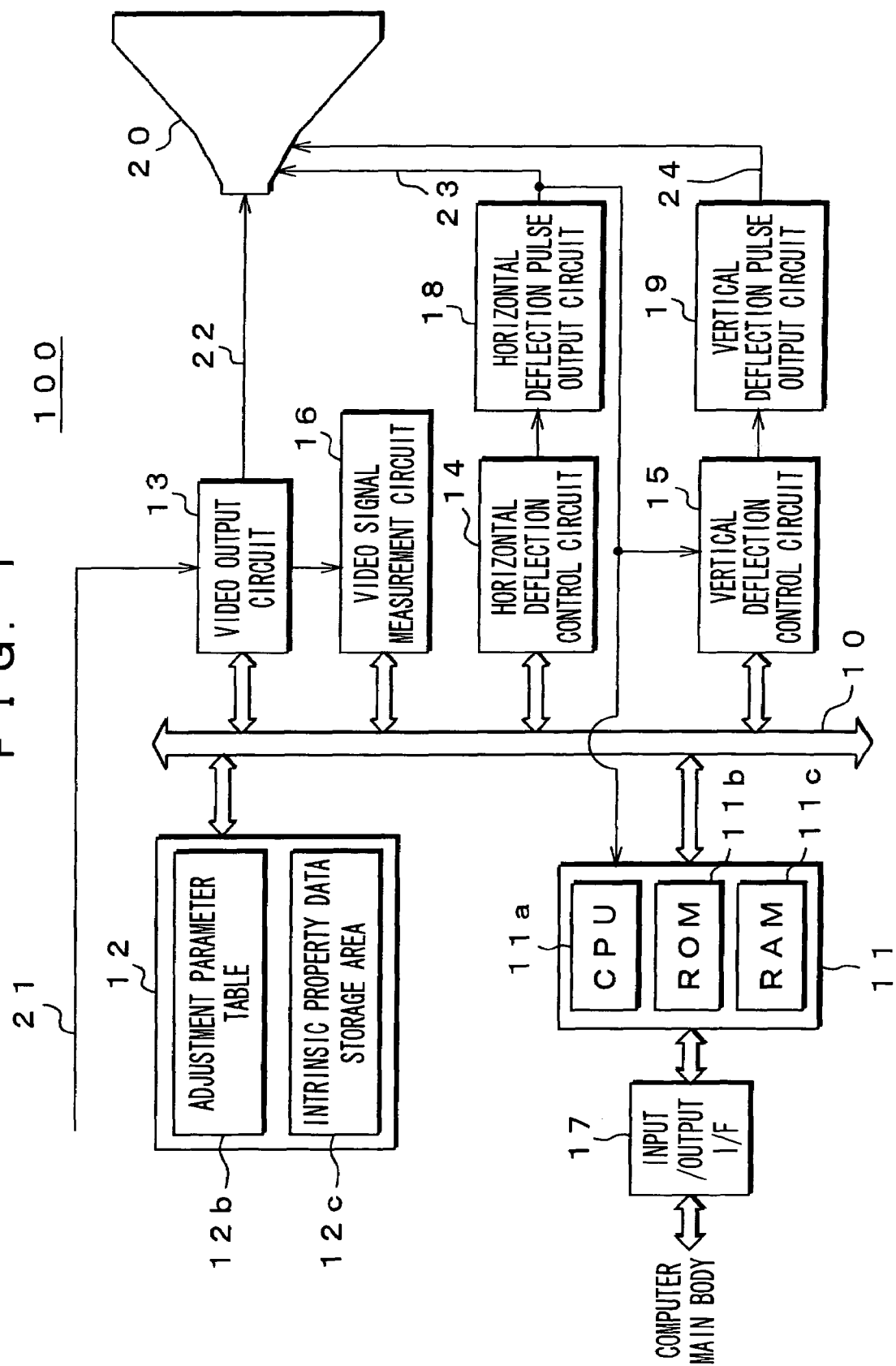
FIG. 1 is a block diagram for showing a configuration of an image display device according to a first embodiment.

The following will describe a first embodiment of the present invention. FIG. 1 shows a configuration of an image display device 100 according to the first embodiment. The image display device 100 is constituted as a multi-scanning type monitor available for use in a plurality of kinds of image signals (hereinafter called "video signals") each of which conforms to the VESA's GTF Standard.

The image display device 100 comprises a main control portion 11, a nonvolatile memory 12, a video output circuit 13, a horizontal deflection control circuit 14, a vertical deflection control circuit 15, and a video signal measurement circuit 16 that are interconnected through a system bus 10. Here, a term "kinds" of the video signal means the kinds of a video signal that can be identified by a frequency of a synchronization signal.

Further, the image display device 100 comprises an input/output interface (I/F) circuit 17 for interconnecting the main control portion 11 and an information processor (main body of a computer), not shown, a horizontal deflection pulse output circuit 18 connected to an output end of the horizontal deflection control circuit 14, a vertical deflection pulse output circuit 19 connected to an output end of the vertical deflection control circuit 15, and a Cathode Ray Tube (CRT) 20 for displaying an image under the control of the video output circuit 13, the horizontal deflection pulse output circuit 18 and the vertical deflection pulse output circuit 19.

The main control portion 11 comprises a Central Processing Unit (CPU) 11a, a Read Only Memory (ROM) 11b in which a control program executed by the CPU11a and necessary data are stored, and a Random Access Memory (RAM) 11c used as a work memory by the CPU11a, thereby controlling operations of the various portions.

The nonvolatile memory 12 comprises, for example, an Electrically Erasable and Programmable ROM (EEPROM), including at least an adjustment parameter table 12b and an intrinsic property data storage area 12c.

The adjustment parameter table 12b is a user table which has such a characteristic that when a user uses the present device, its configuration data pieces (adjustment parameters) are added thereto sequentially, having a configuration shown in, for example, FIG. 2 described later. The intrinsic property data storage area 12c is an area which stores property data that indicates intrinsic display properties measured on the relevant image display device at a factory beforehand, having contents shown in, for example, FIG. 3 described later.

The video output circuit 13 generates an RGB video signal 22 by performing predetermined signal processing on an input video signal 21 based on an instruction sent via the system bus 10 from the control portion 11 and supplies it to the CRT20.

The horizontal deflection control circuit 14 supplies the horizontal deflection pulse output circuit 18 with a deflection control signal for controlling horizontal deflection of an electron beam in the CRT20, according to control data (specifically, a horizontal size adjustment parameter and a horizontal position adjustment parameter) which is set by the main control portion 11. The vertical deflection control circuit 15 supplies the vertical deflection pulse output circuit 19 with a deflection control signal for controlling vertical deflection of the electron beam in the CRT20, according to control data (specifically, a vertical size adjustment parameter and a vertical position adjustment parameter) which is set by the main control portion 11.

The horizontal deflection pulse output circuit 18 performs predetermined signal processing such as waveform shaping on the deflection control signal input from the horizontal deflection control circuit 14 and applies it as a horizontal deflection pulse 23 to a horizontal deflection yoke (not shown) of the CRT20. The vertical deflection pulse output circuit 19 performs predetermined signal processing such as waveform shaping on the deflection control signal input from the vertical deflection control circuit 15 and applies it as a vertical deflection pulse 24 to a vertical deflection yoke (not shown) of the CRT20.

As described later, the horizontal deflection pulse 23 is set so as to have the same frequency as that of the horizontal synchronization signal in the input video signal 21. Each time one of the horizontal deflection pulses 23 is applied to the horizontal deflection yoke of the CRT20, one horizontal line is scanned. The vertical deflection pulse 24 is set so as to have the same frequency as that of the vertical synchronization signal in the input video signal 21. Each time one of the vertical deflection pulses 24 is applied to the vertical deflection yoke of the CRT20, one frame is scanned.

The horizontal deflection pulse 23 is also input to the main control portion 11 and the vertical deflection control circuit 15. The main control circuit 11 forms a feedback loop together with the horizontal deflection control circuit 14 and the horizontal deflection pulse output circuit 18, to conduct proper control on horizontal deflection in accordance with a kind of the input video signal 21 input to the video output circuit 13. The vertical deflection control circuit 15 supplies the above-mentioned deflection control signal to the vertical deflection pulse output circuit 19 each time it receives one frame of the horizontal deflection pulse 23.

To the video signal measurement circuit 16, the same signal as the input video signal 21 is input from the video output circuit 13. The video signal measurement circuit 16 detects a frequency (horizontal synchronization frequency fH, vertical synchronization frequency fV) of a synchronization signal in the input video signal 21 and sends a detection result to the main control portion 11.

The main control portion 11 calculates timing data relative to a waveform of the input video signal 21 using a horizontal synchronization frequency and a vertical synchronization frequency that are sent from the video signal measurement circuit 16. This timing data contains items of the horizontal timing data t1, t2 and t3 and items of the vertical timing data L1, L2 and L3.

The following will describe the items of horizontal timing data t1, t2 and t3 and the items of vertical timing data L1, L2 and L3 with reference to FIGS. 4A and 4B and FIG. 5. It is to be noted that FIG. 4A shows the waveform of the input video signal 21 in one horizontal scanning period, FIG. 4B shows timing of the horizontal deflection pulse 23, and FIG. 5 shows the waveform of the input video signal 21 in one vertical scanning period.

As shown in FIG. 4A, the horizontal timing data t1 indicates a length of a front-side front porch FPH of a horizontal synchronization signal SYNCH and the horizontal timing data t2 indicates a total-sum length of the horizontal synchronization signal SYNCH and its rear-side back porch BPH. The horizontal timing data t3 indicates a length of a horizontal active interval ACTH sandwiched by the back porch BPH and the front porch FPH, that is, the length of a substantial portion of the video signal. This active interval corresponds to a horizontal width of an image region of a screen of the CRT20.

These items of data are given using a unit of, for example, microsecond [μs]. In the following description, an interval including the front porch FPH, the horizontal synchronization signal SYNCH, and the back porch BPH (t1+t2) is referred to as a non-active horizontal interval. It is to be noted that a cycle tH (=t1+t2+t3) of the horizontal synchronization signal SYNCH is determined from a horizontal synchronization frequency fH.

As shown in FIG. 4B, the horizontal deflection pulse 23 has a constant pulse width t4 and has its cycle set so as to be equal to a cycle tH of the horizontal synchronization signal SYNCH. However, its phase is set as shifted by δ H with respect to the video signal. Specifically, it is set so that an offset δ H may be present between a center of the non-active interval of the video signal and a center of the pulse width of the horizontal deflection pulse 23.

Originally, if the offset δ H is 0, the center of the horizontal active interval ACTH of the video signal coincides with the center of the pulse width of the horizontal deflection pulse 23, this state is idealistic in order that a center of the screen and that of the image display region may coincide with each other.

Actually, however, a delay characteristic of the horizontal deflection yoke causes a horizontal-scan starting position of a beam to be shifted by δ H with respect to a position of the horizontal deflection pulse 23. Furthermore, this offset δ H depends on a magnitude of a frequency of the horizontal deflection pulse 23. Therefore, as described later, to place the image display region at the center of the screen exactly, it is necessary to properly set the offset δ H in accordance with a frequency of the horizontal deflection pulse, that is, the frequency of the horizontal synchronization signal SYNCH.

As shown in FIG. 5, the vertical timing data L1 indicates a length of a front-side front porch FPV of a vertical synchronization signal SYNCV and the horizontal timing data 12 indicates a total-sum length of the vertical synchronization signal SYNCV and its rear-side back porch BPV. The vertical timing data L3 indicates a length of a vertical active interval ACTV sandwiched by the back porch BPV and the front porch FPV, that is, the length of a substantial portion of the video signal. This vertical active interval ACTV corresponds to a vertical width of the image region of the screen of the CRT20.

The items of data are given using a unit of, for example, the number of lines. In the following description, an interval (L1+L2) including the front porch FPV, the vertical synchronization signal SYNCV, and the back porch BPV is referred to as a non-active vertical interval. It is to be noted that a cycle LV (=L1+L2+L3) of the vertical synchronization signal SYNCV is determined from a vertical synchronization frequency fV.

The following will describe a method for calculating the items of horizontal timing data t1, t2 and t3 and the items of vertical timing data L1, L2 and L3 using a horizontal synchronization frequency fH (kHz) and a vertical synchronization frequency fV (Hz) that are sent from the video signal measurement circuit 16.

(A) Calculation of the Items of Horizontal Timing Data t1, t2 and t3:

A basic offset constant C' [%] and a basic gradient constant M' [%/kHz] are obtained by Equations (1) and (2), respectively.

$$C'=((C-J)*K/256)+J \qquad (1)$$

$$M'=M*K/256 \qquad (2)$$

In Equations (1) and (2), C indicates an extended offset constant [%], M indicates an extended gradient constant [%/kHz], K indicates a blanking time scaling factor, and J indicates a scaling factor weighting.

By using C' and M', a horizontal blanking duty H Blk Duty is obtained by Equation (3) as follows.

$$H\,Blk\,Duty=C'-(M'/fH) \qquad (3)$$

Further, the cycle tH [μS] of the horizontal synchronization signal SYNCH is obtained by Equation (4) as follows.

$$tH=10^3/fH \qquad (4)$$

Further, based on the horizontal blanking duty H Blk Duty and the cycle tH of the horizontal synchronization signal SYNCH, a horizontal blanking period (non-active interval) H. Blk [μs] is obtained by Equation (5) as follows.

$$H.\,Blk=HBlk\,Duty*tH \qquad (5)$$

Further, a pulse width interval H. Sync [μs] of the horizontal synchronization signal SYNCH is 8% of the cycle tH of the horizontal synchronization signal SYNCH according to the GTF Standard, so that this H. Sync is obtained by Equation (6) as follows.

$$H.\,Sync=tH*0.08 \qquad (6)$$

The GTF Standard defines that a trailing edge of the horizontal synchronization signal SYNCH be placed at a center of the horizontal blanking period, so that the length t1 [μs] of the front-side front porch FPH of the horizontal synchronization signal SYNCH and the total-sum length t2 [μs] of the horizontal synchronization signal SYNCH and its rear-side back porch BPH are obtained by Equations (7) and (8), respectively.

$$t1=H.\,Blk/2-H.\,Sync \qquad (7)$$

$$t2=H.\,Blk/2+H.\,Sync \qquad (8)$$

Then, the length t3 of the horizontal active interval ACTH sandwiched by the back porch BPH and the front porch FPH is obtained by Equation (9) as follows.

$$t3=tH-(t1+t2) \qquad (9)$$

The following will give an example of calculating each value in an actual case where the input video signal represents an image signal comprised of 800×600 dots, its horizontal synchronization frequency fH is 64 [kHz], and its vertical synchronization frequency fV is 100.63 [Hz].

In this case, default values of C=40 [%], J=20 [%], M=600 [%/kHz] and K=128 are used to obtain C'=30 and M'=300 by Equations (1) and (2). Further, these values of C' and M' are used to obtain H Blk Duty=25.3125 [%] by Equation (3). Further, tH=15.625 [μs] is obtained by Equation (4) and H. Blk=3.955 [μs] is obtained by Equation (5) and, further, H. Sync=1.25 [μs] is obtained by Equation (6). Further, t1=0.728 [μs], t2=3.228 [μs] and t3=11.669 [μs] are obtained by Equations (7), (8), and (9), respectively.

(B) Calculation of the Items of Vertical Timing Data L1, L2, and L3:

The total number of vertical lines LV indicates vertical cycle/horizontal cycle and is obtained by Equation (10) as follows.

$$LV=(1/fV)+(1/(fH\times10^3)) \qquad (10)$$

Further, the GTF Standard defines that a total-sum width of the vertical synchronization signal SYNCV and its rear-side back porch BPV be 550 [μs], so that the total-sum length L2 [lines] of the vertical synchronization signal SYNCV and its rear-side back porch BPV is obtained by Equation (11) as follows.

$$L2=550/(10^3/fH) \qquad (11)$$

Further, the GTF Standard defines that the length L1 of the front-side front porch FPV of the vertical synchronization signal SYNCV be fixed to one line. That is, L1=1 [line]. Further, the length L3 [lines] of the vertical active interval ACTV sandwiched by the back porch BPV and the front porch FPV is obtained by Equation (12) as follows.

$$L3=LV-(L1+L2) \qquad (12)$$

The following will give an example of calculating each value in an actual case where the input video signal represents an image signal comprised of 800×600 dots, its horizontal synchronization frequency fH is 64 [kHz], and its vertical synchronization frequency fV is 100.63 [Hz].

In this case, LV=636 [lines] is obtained by Equation (10). L2=35 [lines] and L3=600 [lines] are obtained by Equations (11) and (12), respectively. Note here that L1=1 [line] as described above.

Figures 2, 3:
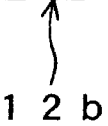
FIG. 2 is an explanatory diagram of contents of an adjustment parameter table in a nonvolatile memory.
FIG. 3 is an explanatory diagram of an intrinsic property data storage area in the nonvolatile memory.

FIG. 2 indicates contents of the adjustment parameter table 12b in the nonvolatile memory 12. This adjustment parameter table 12b stores the adjustment parameters with them being associated with each of the kinds of the video signal (which are identified by a combination of the horizontal synchronization frequency fH and the vertical synchronization frequency fV), so that each time a new kind of the video signal is input, the corresponding new data (one suite of adjustment parameters) is registered therein additionally.

It is to be noted that the adjustment parameters include a horizontal size parameter SH for adjusting a horizontal size of the image region of the screen of the CRT20, a horizontal position parameter PH for adjusting a horizontal position of the image region thereof, a vertical size parameter SV for adjusting a vertical size of the image region thereof, and a vertical position parameter PV for adjusting a vertical position of the image region thereof.

This adjustment parameter table 12b is referenced by the main control portion 11 each time a new kind of the video signal is input, to display an image on the screen of the CRT20 based on the adjustment parameters thus retrieved. However, if no adjustment parameter relative to the relevant kind of the video signal has been registered in the adjustment parameter table 12b, the main control portion 11 calculates the items of horizontal timing data t1, t2, and t3 and the items of vertical timing data L1, L2, and L3 based on the horizontal synchronization frequency fH and the vertical synchronization frequency fV, to obtain the adjustment parameters by using these items of the timing data, thereby displaying the image on the screen of the CRT20 based on the adjustment parameters thus obtained.

FIG. 3 indicates contents of the intrinsic property data storage area 12c in the nonvolatile memory 12. As described above, this intrinsic property data storage area 12c is an area which stores property data indicating intrinsic display properties of the image display device. The items of property data are obtained by measurement when a testing video signal is actually input at a factory beforehand.

As shown in FIG. 3, the property data contains data indicating an association relationship between physical sizes D1 and D2 of the horizontal image region width on the screen and horizontal size adjustment parameters SH1 and SH2 in a case where the testing video signal is input and an active ratio r0 of this video signal (ratio of the length t3 of the horizontal active interval ACTH with respect to a length (tH−t4) of an interval obtained by subtracting the length t4 of the horizontal deflection pulse 23 from the cycle tH). These items of data are used when obtaining a target value of the horizontal size adjustment parameter SH as described above.

Further, as shown in FIG. 3, the property data contains also data indicating characteristics of a dependency of a horizontal offset ratio δ rH on a horizontal synchronization frequency. Note here that the horizontal offset ratio δ rH refers to a ratio of a horizontal offset δ H with respect to the horizontal frequency tH as described later. For example, in an example shown in FIG. 3, data is stored which indicates that when the frequency fH of the horizontal synchronization signal SYNCH takes on values of fH1, fH2, fH3 and fH4, the horizontal offset ratio δ rH must be set to δ rH1, δ rH2, δ rH3 and δ rH4, respectively in order to place the image region at a horizontal center of the screen. Further, as shown in FIG. 3, the property data contains also a correlation between ΔH1, ΔH2 as values of a lapse of time ΔH (hereinafter referred to as "delay") from a beginning of the horizontal synchronization signal SYNCH to a trailing edge of the horizontal deflection pulse 23 and horizontal position parameters Ph1, PH2, as shown in FIGS. 4A and 4B. These items of data are used when obtaining a target value of the horizontal position adjustment parameter PH as described above.

Although the above description has been made by showing only the property data relative to the horizontal direction in FIG. 3, the intrinsic property data storage area 12c also stores similar property data relative to the vertical direction so that it may be referenced when obtaining the vertical size adjustment parameter SV or the vertical position adjustment parameter PV.

Figure 6:
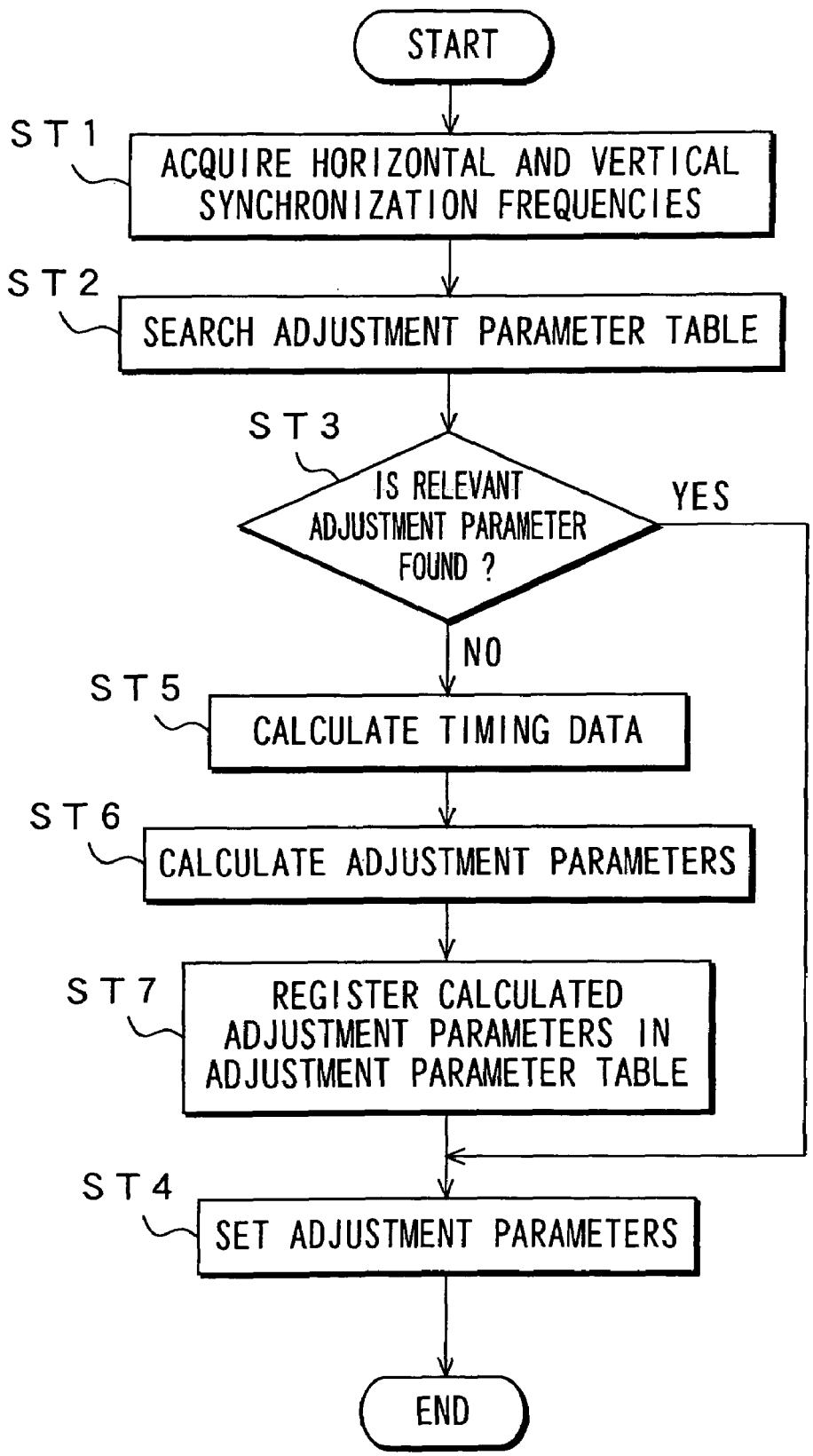
FIG. 6 is a flowchart for showing processing for setting an adjustment parameter.

The following will describe operations of the image display device 100 described above with reference to FIG. 6. In the following description, mainly the operations of the main control portion 11 are explained, thus omitting explanation of the other portions.

First, when the input video signal 21 is input to the video output circuit 13, the main control portion 11 instructs the video signal measurement circuit 16 to measure a horizontal synchronization frequency fH and a vertical synchronization frequency fV of the input video signal 21, thereby acquiring measurement results at step ST1.

Next, at step ST2, the main control portion 11 searches the adjustment parameter table 12b (see FIG. 2) by using these acquired synchronization frequencies fH and fV as a retrieval key. At step ST3, it decides whether there are adjustment parameters that match these synchronization frequencies fH and fV. If there are any adjustment parameters that match the acquired synchronization frequencies fH and fV, it goes to step ST4 wherein these adjustment parameters are read out of the adjustment parameter table 12b to be set to the horizontal deflection control circuit 14 and the vertical deflection control circuit 15. Specifically, these read out horizontal size adjustment parameter SH and horizontal position adjustment parameter PH are set to the horizontal deflection control circuit 14 and these read out vertical size adjustment parameter SV and vertical position adjustment parameter PV are set to the vertical deflection control circuit 15.

If there are no adjustment parameters in the adjustment parameter table 12b that match the detected synchronization frequencies fH and fV, the main control portion 11 calculates the items of horizontal timing data t1, t2 and t3 and the items of vertical timing data L1, L2 and L3 by performing the above-mentioned arithmetic operations based on these synchronization frequencies fH and fV at step ST5.

Next, at step ST6, the main control portion 11 performs a predetermined arithmetic operation, which will be described, using the calculated timing data, thus calculating adjustment parameters. Then, the main control portion 11 additionally registers these obtained adjustment parameters in the adjustment parameter table 12b with them being associated with the horizontal synchronization frequencies fH and fV at step ST7 and also, at step ST4, sets the obtained adjustment parameters to the horizontal deflection control circuit 14 and the vertical deflection control circuit 15.

The horizontal deflection control circuit 14, to which the main control portion 11 sets the horizontal size adjustment parameter SH and the horizontal position adjustment parameter PH, outputs the horizontal deflection control signal to the horizontal deflection pulse output circuit 18 at a timing in accordance with these adjustment parameters, and then the horizontal deflection pulse output circuit 18 performs signal processing on this horizontal deflection control signal to output the horizontal deflection pulse 23 and apply it to the horizontal deflection yoke (not shown) of the CRT20. On the other hand, the vertical deflection control circuit 15, to which the main control portion 11 sets the vertical size adjustment parameter SV and the vertical position adjustment parameter PV, outputs the vertical deflection control signal to the vertical deflection pulse output circuit 19 at a timing in accordance with these adjustment parameters, and then the vertical deflection pulse output circuit 19 performs the signal processing on this vertical deflection control signal to output the vertical deflection pulse 24 and apply it to the vertical deflection yoke (not shown) of the CRT20.

This CRT20 is supplied with the RGB video signal 22 generated from the input video signal 21 at the video output circuit 13. Therefore, on the screen of the CRT20, an image having appropriate size and position is always displayed irrespective of the kind of the input video signal 21.

The following will describe a method for calculating adjustment parameters by the main control portion 11.

The horizontal size adjustment parameter SH and the horizontal position adjustment parameter PH, which are horizontal adjustment parameters, are defined as functions given in the following Equations (13) and (14), respectively.

$$SH = f(t1, t2, t3, D1, D2) \quad (13)$$

$$PH = g(t1, t2, t3, \delta rH1, \delta rH2, \delta rH3, \delta rH4, \Delta H1, \Delta H2, fH) \quad (14)$$

where t1, t2 and t3 indicate quantities defined in FIG. 4, of which values are obtained using the horizontal synchronization frequency fH and the vertical synchronization frequency fV, respectively, as described above. D1 and D2 indicate physical sizes of the image region width in the horizontal direction on the screen when two-point adjustment is performed by inputting the testing video signal; δ rH1, δ rH2, δ rH3 and δ rH4 indicate horizontal offset ratios represented by the horizontal offset δ H with respect to the horizontal cycle tH; and ΔH1 and ΔH2 indicate a delay ΔH shown in FIG. 4. These items of data are stored in the intrinsic property data storage area 12c shown in FIG. 3. fH indicates a frequency of the horizontal synchronization signal SYNCH and is obtained by measuring the input video signal 21.

If an unknown video signal is input, its synchronization frequencies fH and fV are detected and used to calculate the items of timing data t1, t2 and t3, while D1, D2, etc. are read out of the intrinsic property data storage area 12c, so that by applying Equations (13) and (14) to these, the horizontal size adjustment parameter SH and the horizontal position adjustment parameter PH can be obtained. Then, by outputting these adjustment parameters to the horizontal deflection control circuit 14, a size and a position of the image region in the horizontal direction are adjusted properly. The following will be further described on the method more in detail with reference to FIGS. 7–9.

Figure 7:
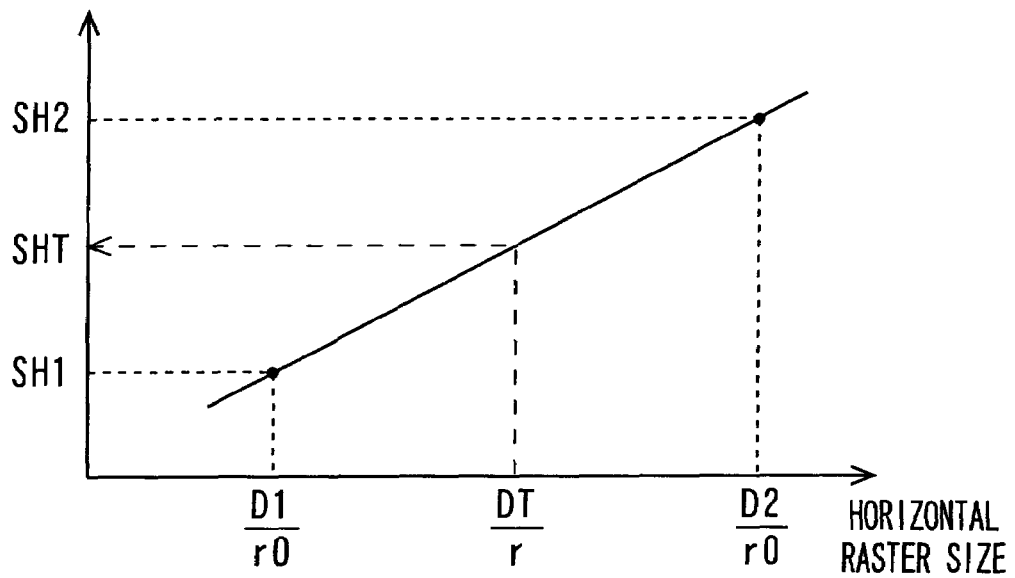
FIG. 7 is an explanatory diagram showing how to obtain a horizontal size adjustment parameter.

First, how to obtain the horizontal size adjustment parameter SH is described with reference to FIG. 7. First, from the intrinsic property data storage area 12c (see FIG. 3) of the nonvolatile memory 12, physical sizes D1 and D2 of the horizontal width of the image region of the screen and the corresponding horizontal size adjustment parameters SH1 and SH2 and an active ratio r0 are read, so that based on these values, horizontal raster sizes D1/r0 and D2/r0 at two adjustment points are calculated. Here, the horizontal raster size refers to a horizontal scanning width. In such a manner, a horizontal raster size vs. the horizontal size adjustment parameter SH interpolation line such as shown in FIG. 7 is obtained. In this case, the horizontal raster size is supposed to change linearly with respect to the horizontal size adjustment parameter.

Next, based on the horizontal synchronization frequency fH and the vertical synchronization frequency fV that are detected from the input video signal 21, the items of timing data t1, t2, and t3 are calculated. Then, an active ratio r of the input video signal is calculated using the following Equation (15).

$$r = t3/(tH-t4) = t3/(t1+t2+t3-t4) \qquad (15)$$

Then, a target physical size DT of the horizontal width of the image region is divided by the active ratio r obtained by Equation (15), to obtain a target value of the raster size DT/r.

Next, from the interpolation line shown in FIG. 7, such a horizontal size adjustment parameter SHT that the raster size may be the value of DT/r thus obtained is obtained. By outputting this horizontal size adjustment parameter SHT to the horizontal deflection control circuit 14, the horizontal size of the image region of the screen is adjusted properly.

Next, how to obtain the horizontal position adjustment parameter PH is described with reference to FIGS. 8 and 9. First, from the intrinsic property data area 12c (see FIG. 3) of the nonvolatile memory 12, data that indicates characteristics of a dependency of the horizontal offset ratio on the horizontal synchronization frequency, that is, the horizontal offset ratios (rHi, (rH2, (rH3, and (rH4 that respectively correspond to the frequencies fH1, fH2, fH3 and fH4 of the horizontal synchronization signal SYNCH are read out in the example shown in FIG. 3 and, based on these values, a horizontal synchronization frequency fH vs. horizontal offset ratio (rH interpolation line as shown in FIG. 8 is obtained.

Figure 8:
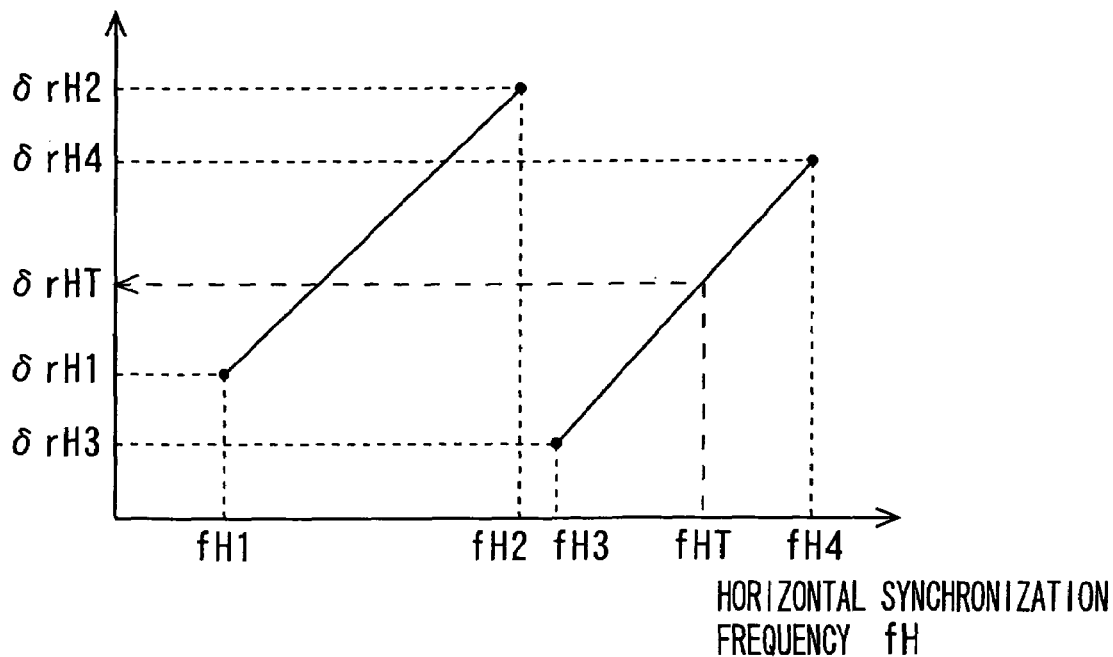
FIG. 8 is an explanatory diagram showing how to obtain a horizontal position adjustment parameter.

Next, from the interpolation line shown in FIG. 8, a horizontal offset ratio δ rHT that corresponds to a target frequency fHT (that is, the horizontal synchronization frequency fH of the input video signal 21) is obtained.

As is clear from FIG. 4, a delay ΔH (that is, a lapse of time from the beginning of the horizontal synchronization signal SYNCH to the trailing edge of the horizontal deflection pulse 23) is given by the following Equation (16).

$$\Delta H = (t2-t1+t4)/2 - \delta rH \times tH \qquad (16)$$

Then, by substituting a target value δ rHT as the offset ratio δ rH of Equation (16), a target delay ΔHT is obtained.

Figure 9:
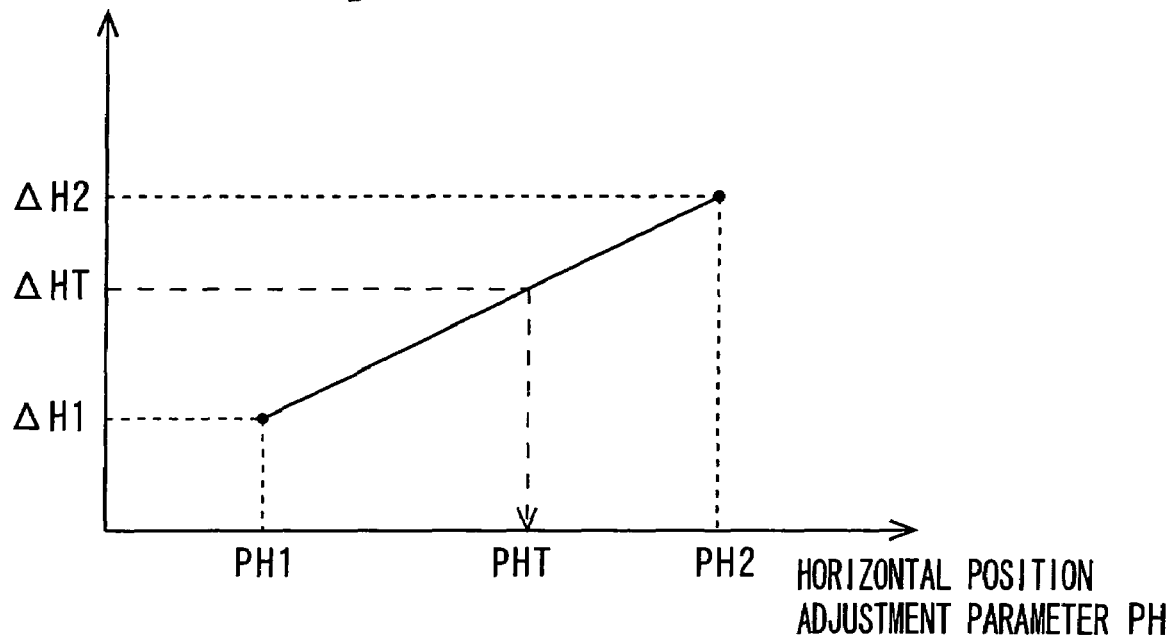
FIG. 9 is another explanatory diagram showing how to obtain the horizontal position adjustment parameter.

Next, the main control portion 11 reads out of the intrinsic property data storage area 12c (see FIG. 3) delays ΔH1 and ΔH2 and the corresponding horizontal position parameters PH1 and pH2, to obtain a delay ΔH vs. horizontal position parameter PH interpolation line as shown in FIG. 9. In this case, the delay ΔH is supposed to change linearly with respect to the horizontal position parameter PH.

Next, the main control portion 11 obtains a horizontal position adjustment parameter PHT that corresponds to the target delay ΔHT obtained by Equation (16), from the delay ΔH vs. horizontal position parameter PH interpolation line shown in FIG. 9. By outputting this horizontal position adjustment parameter PHT to the horizontal deflection control circuit 14, the horizontal position of the image region of the screen is adjusted properly.

Although how to obtain the adjustment parameter in horizontal scanning has been described above, the basic procedure is also the same with an adjustment parameter in vertical scanning. It is described briefly as follows.

The vertical size adjustment parameter SV and the vertical position adjustment parameter PV, which are vertical adjustment parameters, are defined as functions given in the following Equations (17) and (18), respectively.

$$SV = F(L1, L2, L3, E1, E2) \qquad (17)$$

$$PV = G(L1, L2, L3, fV) \qquad (18)$$

In this case, L1, L2 and L3 indicate quantities defined in FIG. 5, of which values are obtained using the horizontal synchronization frequency fH and the vertical synchronization frequency fV, respectively, as described above. E1 and E2 indicate physical sizes of the image region in the horizontal direction on the screen when two-point adjustment is performed by actually inputting the testing video signal and are stored in the intrinsic property data storage area 12c shown in FIG. 3 (which is not shown in FIG. 3 though). fV indicates a frequency of the vertical synchronization signal SYNCV and is obtained by measuring the input video signal 21.

If an unknown video signal is input, its synchronization frequencies fH and fV are detected and used to calculate the items of timing data L1, L2 and L3, while E1 and E2 (not shown) are read out of the intrinsic property data storage area 12c, so that by applying Equations (17) and (18) to these, the vertical size adjustment parameter SV and the vertical position adjustment parameter PV can be obtained. Then, by outputting these adjustment parameters to the vertical deflection control circuit 15, the size and the position of the image region are adjusted properly also in the vertical direction.

In such a manner, by the present embodiment, the horizontal synchronization frequency fH and the vertical synchronization frequency fV detected from the input video signal 21 are used to calculate the items of horizontal timing data t1, t2, and t3 and the items of vertical timing data L1, L2, and L3 that are relative to a waveform of this input image signal 21, and these items of timing data are used to calculate and use the adjustment parameters SH, PH, SV and PV for adjusting an image display state (display size, display position), to thus eliminate a necessity of storing the timing data that corresponds to a plurality of kinds of input video signals, thereby saving on a memory capacity.

Further, in the present embodiment, by storing calculated adjustment parameters SH, PH, SV and PV in the adjustment parameter table 12b with them being associated with the horizontal synchronization frequency fH and the vertical synchronization frequency fV, when predetermined adjustment parameters that corresponds to the horizontal synchronization frequency fH and the vertical synchronization frequency fV detected from the input video signal 21 is present in the adjustment parameter table 12b, an image relative to the input video signal 21 can be displayed on the basis of the predetermined adjustment parameters (see ST3 and ST8 of FIG. 6) to thereby immediately acquire the adjustment parameters from the adjustment parameter table 12b, if the same kind of image signal is input, without calculating a timing data or adjustment parameters, in order to reduce a lapse of time from a moment when the video signal is input to a moment when the image is displayed, thus improving a response.

Although the first embodiment has been described to the effect that the input video signal 21 conforms to the GTF Standard, any other input video signal can be accommodated as far as the horizontal and vertical timing data can be calculated on the basis of the horizontal synchronization frequency and the vertical synchronization frequency.

The following will describe the second embodiment of the present invention. FIG. 10 shows a configuration of an image display device 100A according to the second embodiment. The image display device 100A is constituted as a multi-scanning type monitor that can accommodate a plurality of kinds of image signals (hereinafter called "video signals") including an image signal conforming to the VESA's GRF Standard. Components of FIG. 10 that correspond to those of FIG. 1 are indicated by the same reference symbols and explanation thereof is omitted.

The image display device 100A has a video signal measurement circuit 16A in place of the video signal measurement circuit 16 in the image display device 100 shown in FIG. 1. To the video signal measurement circuit 16A, the same signal as the input video signal 21 is input from a video output circuit 13. The video signal measurement circuit 16A measures frequencies (horizontal synchronization frequency fH and vertical synchronization frequency fV) of a synchronization signal in the input video signal 21 and a polarity of the synchronization signal and sends measurement results as kind data to a main control portion 11.

Further, the image display device 100A has a nonvolatile memory 12A in place of the nonvolatile memory 12 in the image display device 100 shown in FIG. 1. The nonvolatile memory 12A is constituted of, for example, an Electrically Erasable and Programmable ROM (EEPROM), comprising at least a timing data table 12a and an intrinsic property data storage area 12c.

The intrinsic property data storage area 12c is the same as that contained in the nonvolatile memory 12 in the image display device 100 shown in FIG. 1 (see FIG. 3). The timing data table 12a is created by storing various items of timing data correlated to each of the kinds of the video signals at a factory beforehand.

FIG. 11 shows contents of the timing data table 12a in the nonvolatile memory 12A. The timing data table 12a is created and written into the nonvolatile memory 12A at the factory etc. beforehand, having such a configuration that timing data 122 relative to a waveform of each of the video signals and a signal type are correlated to each other for each of the kinds (kind data 121) of the video signal expected to be used beforehand.

The kind data 121 contains a frequency and a polarity of each of the horizontal and vertical synchronization signals, while the timing data 122 contains items of horizontal timing data t1, t2, t3, and t4 and items of vertical timing data L1, L2, and L3. These items of horizontal timing data t1, t2, and t3 and the items of vertical timing data L1, L2, and L3 are the same as those described with the above first embodiment and explanation thereof is omitted.

In an example shown, timing data relative to a video signal etc. having a horizontal synchronization signal having, for example, a frequency of 81.9 kHz and a negative polarity [N] and a vertical synchronization signal having a frequency of 75 Hz and the negative polarity [N] is recorded. It is to be noted that the signal type may be, for example, a separation type (SEP) wherein horizontal and vertical synchronization signals are separated from a substantial portion (active interval) of the video signal and a composite type (COMP) wherein they are mixed with the substantial portion of the video signal.

Further, the image display device 100A has a delay measurement circuit 30. The delay measurement circuit 30 is supplied with a horizontal synchronization signal SYNCH output from the video signal measurement circuit 16A as well as with a horizontal deflection pulse 23 output from a horizontal deflection pulse output circuit 18. The delay measurement circuit 30 measures a lapse of time from a beginning of the horizontal synchronization signal SYNCH to a trailing edge of the horizontal deflection pulse 23 as a delay ΔH (see FIGS. 4A and 4B) and sends measurement results to the main control portion 11.

Other components of the image display device 100A are the same as those in configuration of the image display device 100 shown in FIG. 1.

Figure 12:
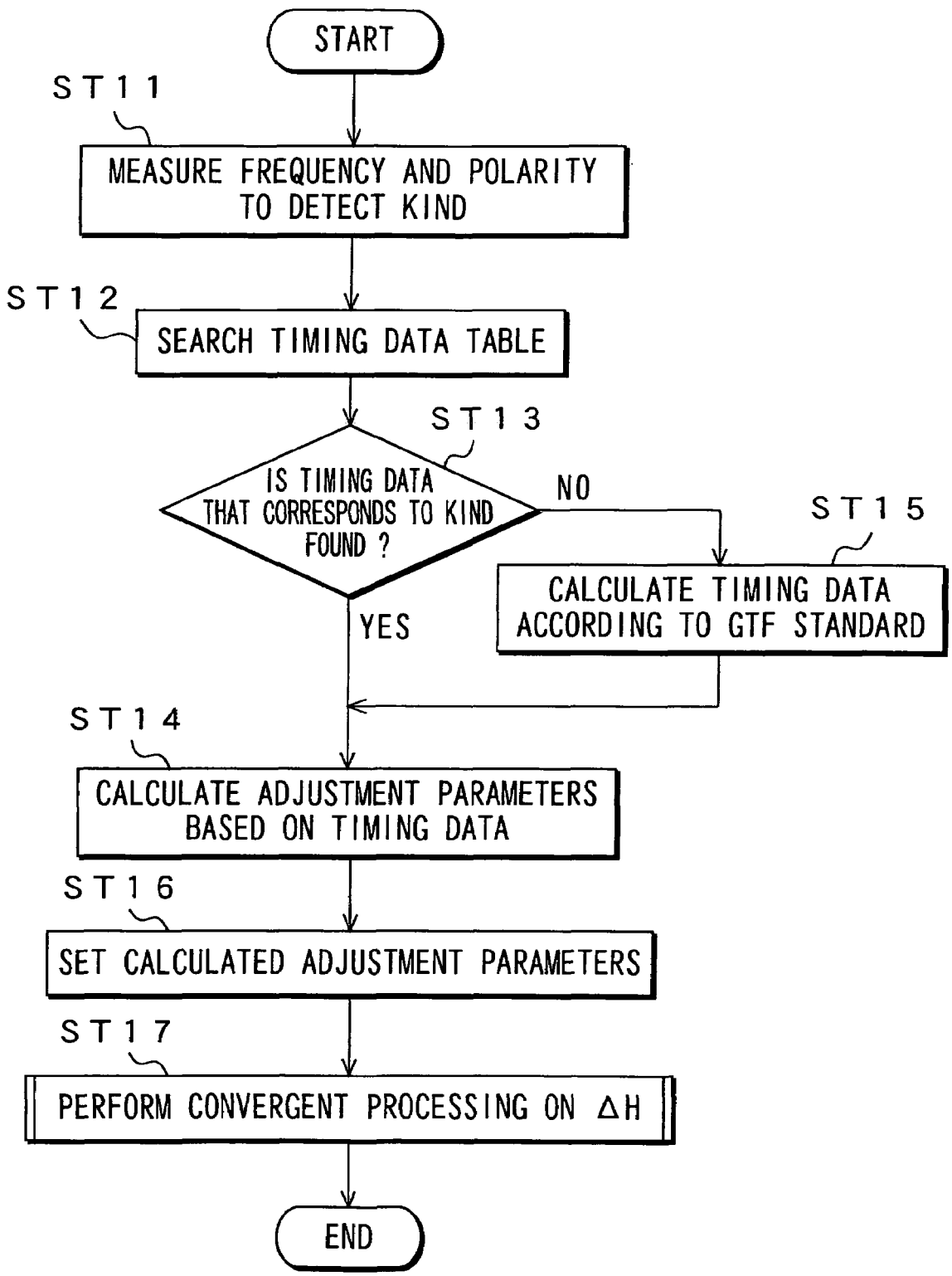
FIG. 12 is a flowchart for showing processing for setting an adjustment parameter.

The following will describe operations of the image display device 100A with reference to FIG. 12. In the following description, mainly the operations of the main control portion 11 are described, omitting the other portions.

First, when the input video signal 21 is input to the video output circuit 13, the main control portion 11 instructs the video signal measurement circuit 16A to measure frequencies (horizontal synchronization frequency fH and vertical synchronization frequency fV) of a synchronization signal in the input video signal 21, thereby acquiring measurement results as kind data at step ST11.

Next, at step ST12, the main control portion 11 searches the adjustment parameter table 12a (see FIG. 11) by using the acquired kind data as a retrieval key. At step ST13, it decides whether there is timing data that matches the kind data. If there is any timing data that matches the acquired kind data, it goes to step ST14.

If there is no timing data that matches the acquired kind data, on the other hand, the main control portion 11 uses a horizontal synchronization frequency fH and a vertical synchronization frequency fV of the acquired kind data, to calculate the items of horizontal timing data t1, t2, and t3 and the items of vertical timing data L1, L2 and L3 and the process then goes to step ST14. How to calculate the timing data is the same as that described with the first embodiment and so explanation thereof is omitted here.

At step ST14, the main control portion 11 uses the timing data to calculate adjustment parameters (horizontal size adjustment parameter SH, horizontal position adjustment parameter PH, vertical size adjustment parameter SV, and vertical size adjustment parameter PV). How to calculate these adjustment parameters is the same as that described with the first embodiment and explanation thereof is omitted here.

Next, at step ST16, the main control portion 11 sets the calculated adjustment parameters to a horizontal deflection control circuit 14 and a vertical deflection control circuit 15.

The horizontal deflection control circuit 14, to which the main control portion 11 sets the horizontal size adjustment parameter SH and the horizontal position adjustment parameter PH, outputs a horizontal deflection control signal to the horizontal deflection pulse output circuit 18 at a timing in accordance with these adjustment parameters, and then the horizontal deflection pulse output circuit 18 performs signal processing on this horizontal deflection control signal to output the horizontal deflection pulse 23 and apply it to a horizontal deflection yoke (not shown) of a CRT20.

On the other hand, the vertical deflection control circuit 15, to which the main control portion 11 sets the vertical size adjustment parameter SV and the vertical position adjustment parameter PV, outputs a vertical deflection control signal to a vertical deflection pulse output circuit 19 at a timing in accordance with these adjustment parameters, and then the vertical deflection pulse output circuit 19 performs the signal processing on this vertical deflection control signal to output a vertical deflection pulse 24 and apply it to a vertical deflection yoke (not shown) of the CRT20.

Further, this CRT20 is supplied with an RGB video signal 22 generated from the input video signal 21 at the video output circuit 13. Therefore, on the CRT20, an image having appropriate size and position is always displayed irrespective of the kind of the input video signal 21.

If, in this case, a deflection system is not deteriorated over time, by setting the calculated horizontal position adjustment parameter PH to the horizontal deflection control circuit 14, a lapse of time from the beginning of the horizontal synchronization signal SYNCH to the trailing edge of the horizontal deflection pulse 23, that is, a delay $\Delta H$ becomes equal to a target delay $\Delta HT$, thus placing a horizontal display position at a right position.

If the deflection system is deteriorated over time, on the other hand, the delay $\Delta H$ is different from the target delay $\Delta HT$, resulting in the horizontal display position being shifted from the right position. Therefore, at step ST17, the main control portion 11 then performs convergent processing on the delay $\Delta H$ so that the delay may be equal to the target delay $\Delta HT$ and then ends the processing.

Figure 13:
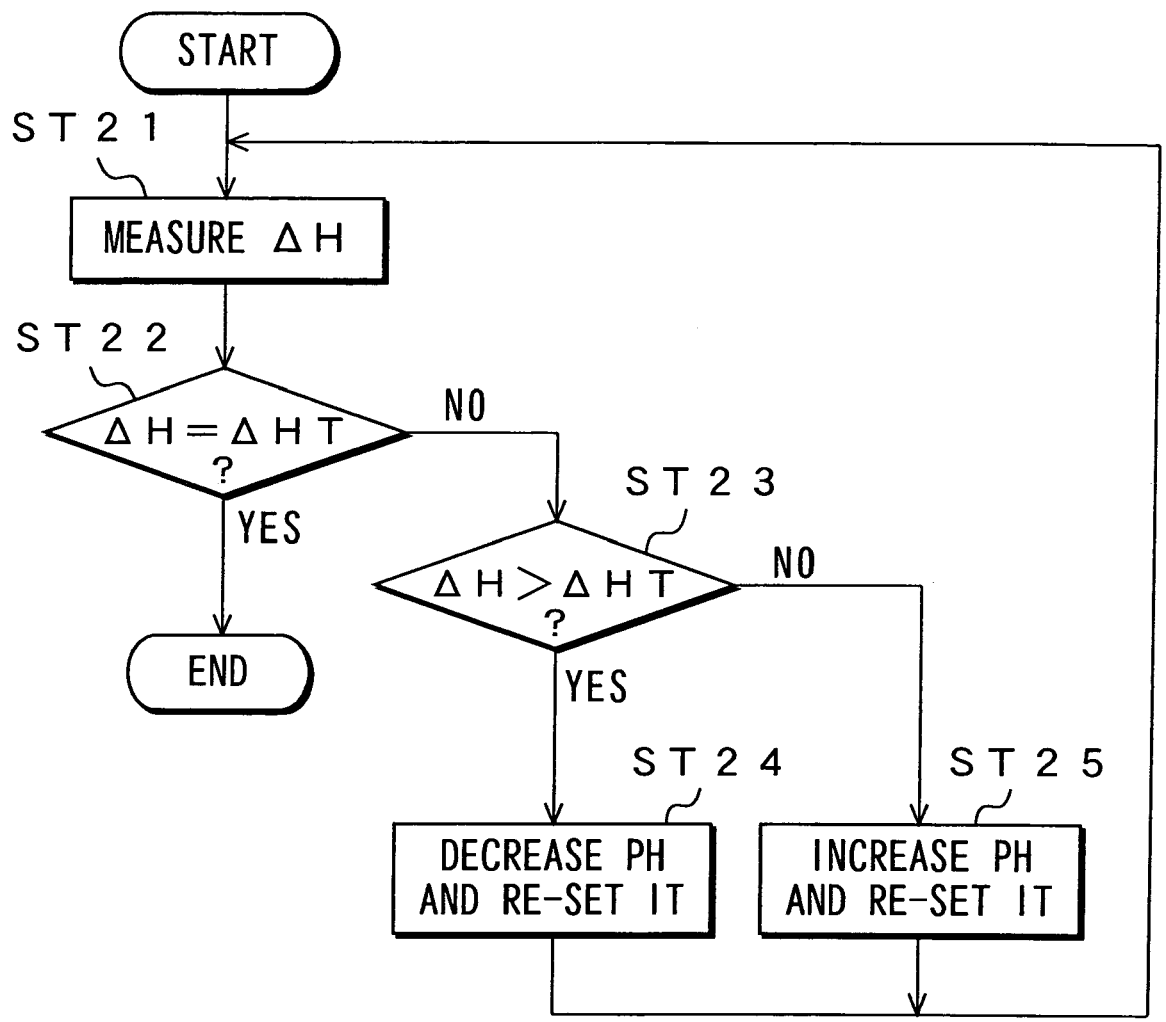
FIG. 13 is a flowchart for showing convergent processing of a delay.
Figure 14:
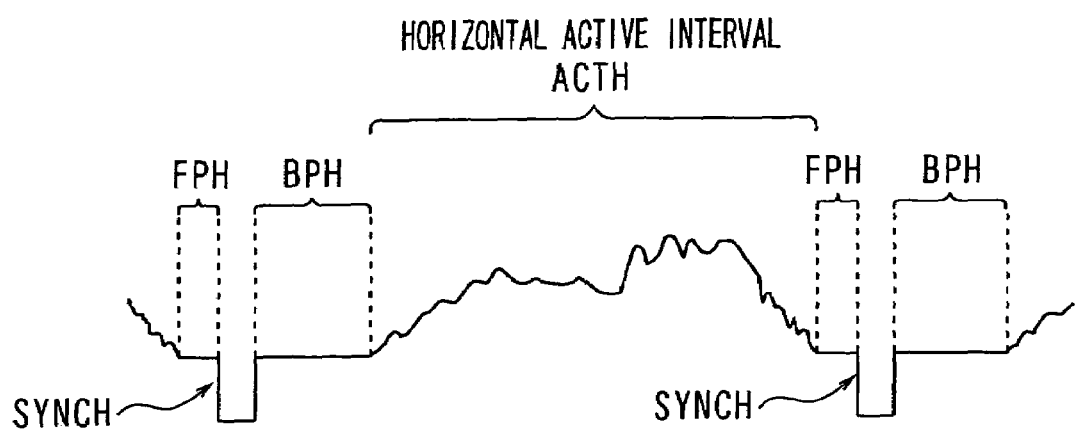
FIG. 14 is a diagram for showing a waveform of a video signal in one horizontal scanning period.
Figure 15:
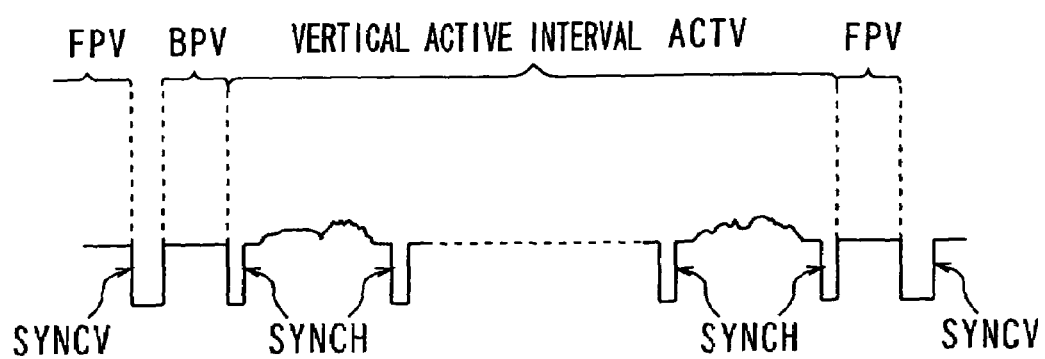
FIG. 15 is a diagram for showing a waveform of a video signal in one vertical scanning period.

The following will describe processing operations for performing convergent processing on the delay $\Delta H$, with reference to FIG. 13.

First, at step ST21, the main control portion 11 instructs the delay measurement circuit 30 to measure a delay $\Delta H$, thus acquiring a measurement result. At step ST22, the main control portion 11 decides whether the delay $\Delta H$ is equal to the target delay $\Delta HT$. Note here that the target delay $\Delta HT$ is obtained by substituting a target value $\delta$ rHT obtained from an interpolation line shown in FIG. 8 into $\delta$ rH of Equation (16).

If the delay $\Delta H$ is not equal to the target delay $\Delta HT$, the main control portion 11 decides whether the delay $\Delta H$ is larger than the target delay $\Delta HT$, at step ST23. If the delay $\Delta H$ is larger than the target delay $\Delta HT$, the main control portion 11 subtracts one alteration unit from a value of the horizontal position adjustment parameter PH set to the horizontal deflection control circuit 14 and re-sets it at step 24, and then the process returns to step ST21. If the delay $\Delta H$ is smaller than the target delay $\Delta HT$, on the other hand, the main control portion 11 adds one alteration unit to the value of the horizontal position adjustment parameter PH set to the horizontal deflection control circuit 14 and re-sets it at step ST 25 and then the process returns to step ST21.

Further, if it is decided that the delay $\Delta H$ is equal to the target delay $\Delta HT$ at step ST22, the convergent processing ends. It is to be noted that the delay $\Delta H$ being equal to the target delay $\Delta HT$ refers not only to a case where the delay $\Delta H$ coincides with the target delay $\Delta HT$ completely but also to a case where the delay $\Delta H$ falls in a range having the target delay $\Delta HT$ at a center thereof and a predetermined margin on its both sides.

In such a manner, by the second embodiment, the convergent processing is performed on the delay $\Delta H$ so that it may be equal to the target delay $\Delta HT$, thereby allowing the horizontal display position to be placed at the right position even if the deflection system is deteriorated over time.

It is to be noted that, in the second embodiment, although not described, the same adjustment parameter table 12b as that of the first embodiment may be provided. In this case, adjustment parameters obtained at step ST14 are registered in the adjustment parameter table 12b with them being associated with the kind data obtained from the input video signal 21. Then, in a case where the input video signal is newly input, if the adjustment parameters that correspond to the kind data obtained therefrom are present in the adjustment parameter table 12b, the adjustment parameters that correspond to the input video signal 21 are read out of the adjustment parameter table 12b and used without calculating the adjustment parameter.

Although the first embodiment described above has not performed the convergent processing such as that performed in the second embodiment, the convergent processing may be performed much the same way as the second embodiment so that the delay $\Delta H$ may be equal to the target delay $\Delta HT$. In this case, for example, after step ST4 of FIG. 6, a step for performing the convergent processing (see step ST17 of FIG. 12) might be inserted. By performing the convergent processing in such a manner, the horizontal display position can be placed at the right position even if the deflection system is deteriorated over time.

It is to be noted that although the embodiments described above have obtained an adjustment parameter using property data specific to each device (see FIG. 3), the present invention is not limited thereto; for example, the same fixed data may be used as the property data uniformly on all devices as far as they have a slight difference from each other.

Further, although the embodiments described above have obtained the adjustment parameters according to a procedure described along FIGS. 7–9, any other procedures may be followed.

According to the present invention, the horizontal synchronization frequency and the vertical synchronization frequency detected from the input video signal are used to calculate timing data relative to a waveform of the input image signal, then the timing data is used to obtain adjustment parameters each for adjusting an image display state, and based on the adjustment parameters an image relative to the input image signal is displayed. It eliminates a necessity of storing the timing data that corresponds to the plurality of kinds of image signals in order to obtain adjustment parameters that correspond to a plurality of kinds of image signals, thus enabling saving on a memory capacity.

Further, according to the present invention, by storing the calculated adjustment parameters in storage means with them being associated with the horizontal synchronization frequency and the vertical synchronization frequency, when predetermined adjustment parameters that correspond to the horizontal synchronization frequency and the vertical synchronization frequency detected from the input video signal are present in the storage means, an image relative to the input video signal can be displayed on the basis of the predetermined adjustment parameters to thereby immediately acquire the same kind of image signal from the storage means, if the same kind of image signal is input, without calculating timing data or adjustment parameters, in order to reduce a lapse of time from a moment when the image signal is input to a moment when the image is displayed, thus improving a response.

Further, according to the present invention, timing data relative to a waveform of the input image signal is used to calculate the adjustment parameters each for adjusting the image display state, and this adjustment parameter is set to a deflection control circuit, so that subsequently a delay of the deflection pulse with respect to the horizontal synchronization signal of the input image signal is measured, to alter a value of the horizontal position parameter so that the delay may be equal to a target delay and re-set it to the deflection control circuit, thus enabling placing the horizontal display position at the right position even if the deflection system is deteriorated over time.

INDUSTRIAL APPLICABILITY

As described above, image display device and method according to the present invention are well applied to a so-called multi-scanning type monitor having a function that can accommodate various image signals.

The invention claimed is:

1. An image display device comprising:
    image display means for displaying an image of an input image signal;
    detection means for detecting a horizontal synchronization frequency and a vertical synchronization frequency of said input image signal;
    storage means for storing predetermined adjustment parameters in cross-reference to respective pairs of frequencies, each pair of frequencies including a predetermined horizontal synchronization frequency and a predetermined vertical synchronization frequency;
    decision means for determining whether the horizontal synchronization frequency and vertical synchronization frequency detected by said detection means matches one of said pairs of frequencies; and
    control means for controlling display of said image by said display means,
    wherein when said decision means determines that the horizontal synchronization frequency and vertical synchronization frequency detected by said detection means matches one of said pairs of frequencies, said control means controls display of said image by said display means based on the predetermined adjustment parameter that is cross-referenced to said matching pair of frequencies, and
    wherein when said decision means determines that the horizontal synchronization frequency and vertical synchronization frequency detected by said detection means does not match one of said pairs of frequencies, said control means calculates timing data relative to a waveform of said input image signal using the horizontal synchronization frequency and vertical synchronization frequency detected by said detection means, calculates an adjustment parameter based on the calculated timing data, and controls said display of said image by said display means based on the calculated adjustment parameter.

2. An image display method comprising the steps of:
    displaying image an image of an input image signal on a display means;
    detecting a horizontal synchronization frequency and a vertical synchronization frequency of said input image signal;
    storing predetermined adjustment parameters in cross-reference to respective pairs of frequencies in a storage means, each pair of frequencies including a predetermined horizontal synchronization frequency and a predetermined vertical synchronization frequency;
    determining whether the horizontal synchronization frequency and vertical synchronization frequency detected in said step of detecting matches one of said pairs of frequencies; and
    controlling display of said image by said display means,
    wherein when it is determined in said step of determining that the horizontal synchronization frequency and vertical synchronization frequency detected in said step of detecting matches one of said pairs of frequencies, said step of controlling comprises the step of controlling display of said image by said display means based on the predetermined adjustment parameter that is cross-referenced to said matching pair of frequencies, and
    wherein when it is determined in said step of determining that the horizontal synchronization frequency and vertical synchronization frequency detected in said step of detecting does not match one of said pairs of frequencies, said step of controlling comprises the steps of calculating timing data relative to a waveform of said input image signal using the horizontal synchronization frequency and vertical synchronization frequency detected in said step of detecting, calculating an adjustment parameter based on the calculated timing data, and controlling said display of said image by said display means based on the calculated adjustment parameter.

* * * * *

UNITED STATES PATENT AND TRADEMARK OFFICE
CERTIFICATE OF CORRECTION

| | |
|---|---|
| PATENT NO. | : 7,224,350 B2 |
| APPLICATION NO. | : 10/479333 |
| DATED | : May 29, 2007 |
| INVENTOR(S) | : Shigeru Takasu and Motosuke Irie |

It is certified that error appears in the above-identified patent and that said Letters Patent is hereby corrected as shown below:

Column 1, line 6 "to image" should read --to an image--;

Column 1, line 9 "to image" should read --to an image--;

Column 1, line 22 "to image" should read --to an image--;

Column 2, line 27 "make" should read --makes--;

Column 3, line 1 "takes rather" should read --takes a rather--;

Column 15, line 17 "corresponds" should read --correspond--;

Column 15, line 19 "is" should read --are--;

Column 16, line 65 "data," should read --data--;

Column 19, line 54 "matches" should read --match--;

Column 20, line 2 "matches" should read --match--;

Column 20, line 10 "means does not" should read --means do not--;

Column 20, line 20 "displaying image an" should read --displaying an--;

Column 20, line 32 "matches" should read --match--;

Column 20, line 39 "matches" should read --match--;

UNITED STATES PATENT AND TRADEMARK OFFICE
CERTIFICATE OF CORRECTION

PATENT NO. : 7,224,350 B2
APPLICATION NO. : 10/479333
DATED : May 29, 2007
INVENTOR(S) : Shigeru Takasu and Motosuke Irie It is certified that error appears in the above-identified patent and that said Letters Patent is hereby corrected as shown below:

Column 20, line 47 "does" should read --do--.

Signed and Sealed this

Tenth Day of March, 2009

JOHN DOLL
*Acting Director of the United States Patent and Trademark Office*